Patented Jan. 25, 1944

2,339,946

UNITED STATES PATENT OFFICE 2,339,946

RUBBER CHLORIDE MANUFACTURE

James Wallace Raynolds, Pittsburgh, Pa., assignor to The Raolin Corporation, Charleston, W. Va., a corporation of West Virginia No Drawing. Application March 6, 1939, Serial No. 260,217

5 Claims. (Cl. 260—772)

This invention relates to rubber chloride manufacture; and it comprises an improved process of making rubber chloride, wherein a substantially anhydrous rubber solution is chlorinated, and excess chlorine and hydrochloric acid formed by reaction are eliminated by air-blowing before or after chlorination is completed, and advantageously at two stages of chlorination; all as more fully hereinafter set forth and as claimed.

It has long been known that rubber reacts with chlorine to form a rather extensive series of products which are known generically as rubber chlorides or chlorinated rubbers. It is thought that the chlorine enters the rubber chloride molecule partly by addition at the double bonds of the caoutchouc (or polyprene), and partly by substitution for hydrogen atoms, forming HCl. Observation indicates that the substitution reactions may take place first and quite rapidly, and under some conditions may approach completion before the addition reactions begin to occur.

When using good rubber, effective chlorination produces substances which are believed to have the formulae $C_{10}H_{13}Cl_7$ and $C_{10}H_{12}Cl_8$. The first, rubber heptachloride, is believed to contain four added chlorine atoms and three substituted chlorine atoms per molecule. It contains 65.1 per cent chlorine by weight. The octachloride is believed to have four added and four substituted chlorine atoms, and it contains 68.2 per cent chlorine by weight. Compounds containing 65 per cent or more of chlorine are much more stable than rubber chlorides with lower chlorine contents.

Many methods of preparing chlorinated rubbers have been proposed, including dry chlorination and chlorination in the liquid phase. The liquid phase methods are usually advantageous, and generally include a preliminary preparation of a "rubber cement." This is a rather dilute solution of rubber in carbon tetrachloride, for example, which is then chlorinated, advantageously by bubbling gaseous chlorine therethrough at a suitable temperature. Rubber chloride is formed in solution. Various methods of purifying the liquid before and after chlorination, and of precipitating chlorinated rubber, have been proposed. After chlorination is completed, removal of hydrochloric acid formed in the substitution reactions becomes necessary.

In certain processes previously proposed, such as that disclosed in a North application, Serial No. 62,547 (now Patent No. 2,148,830), HCl is eliminated by neutralization with finely divided calcium oxide or other basic material. It is the general practice in the art to eliminate HCl with basic materials in solid form or in aqueous solutions. Solid residues resulting from such neutralization are difficult of removal from the system, however, and tend to contaminate the final product. This is a disadvantage, since rubber chloride must be of the greatest attainable purity to have its desirable properties in full measure.

I have found that these difficulties are obviated by removing the HCl physically, without adding foreign chemicals. In the present invention, chlorination of a rubber solution is continued until the desired end point is reached, at which time the temperature of the liquid is advantageously about 60° to 70° C. Dry air is then introduced into the reaction vessel under suitable pressure, such as 2 to 5 pounds gage, and the air quickly displaces the hydrochloric acid and the residual chlorine, driving these gases out of the system. The time required for obtaining complete elimination varies in accordance with the size and shape of the vessel. Ordinarily, blowing for 1 to 2 hours is sufficient to reduce the acid content of the solution to 0.03 per cent, or less, calculated as HCl. This acidity is conveniently determined by titrating a sample of the solution with tenth-normal NaOH.

This method of eliminating hydrochloric acid is much more convenient and economical than neutralizing with lime, etc., and it obviates an after purification to get rid of foreign solids. To make air-blowing effective in reducing acidity to the desired extent, however, the solution treated must be substantially anhydrous. This condition is readily obtained by boiling the liquid rubber cement under a reflux, before chlorination, until it is substantially dry. This also produces a condition of reduced viscosity. The details of this procedure are described in the aforesaid North application, and in my prior and copending application, Serial No. 245,293, filed December 12, 1938, of which this application is a continuation-in-part.

In addition to a final air-blowing of the completely chlorinated solution to eliminate hydrochloric acid, it is often advantageous to blow at an intermediate stage of chlorination, thereby facilitating the completion of the reaction. Dissolved rubber, especially if the solution is substantially anhydrous, may be readily and quickly chlorinated to a chlorine content of about 55 to 58 per cent, and sometimes as high as 63 per cent, but it is difficult to quickly complete the conversion to a chlorinated rubber having a chlorine content of 65 per cent or more. Products containing less than 65 per cent chlorine are less stable and less desirable for commercial uses than the products containing more than 65 per cent chlorine, however. For example, rubber chloride containing 63 per cent chlorine is relatively unstable at 100° C., while products containing more than 65 per cent chlorine are quite stable up to approximately 150° C.

One explanation of the difficulty encountered in completing the chlorination of rubber to chlorine contents of 65 per cent or more is based on the observation, previously mentioned, that the substitution reactions involved apparently precede the addition reactions. It may be that some of the HCl which is liberated during the substitution reactions is taken up at the double bonds in a rather "loose" union, and thus tends to inhibit the addition of chlorine at these bonds. Another possibility is that the addition reactions may precede, or take place simultaneously with, the substitution reactions; and that the completion of the substitution reactions to the desired stage is facilitated by elimination of one of the products of these reactions—the HCl. Without binding myself to any explanation or theory, it is noted as an empirical fact that by blowing out some HCl at an intermediate stage in the operation, better results are obtained. For example, this makes it possible to produce chlorinated rubber of high chlorine content and high stability in a much shorter time than is otherwise possible. This intermediate stage is usually reached when a chlorine content of about 50 to 60 per cent is obtained, although the chlorination may sometimes be carried a little higher before the intermediate air-blow.

It is often possible to displace some of the interfering HCl at an intermediate stage of chlorination by heating the solution up to the boiling point of the solvent, but I have found such heating is frequently undesirable. The reaction product or chlorinated rubber, at the stage when the HCl blocking becomes troublesome, may contain 55 to 63 per cent chlorine, as noted, and often contains only about 50 to 58 per cent chlorine. Chlorinated rubbers containing 55 to 58 per cent chlorine, for example, are unstable to heat, and tend to break down rapidly at temperatures above 65° C. Thus, if the solution which is heated to the boiling point (about 76° C. for carbon tetrachloride) contains compounds having a chlorine content of the order of 55 to 58 per cent chlorine or less, which is usually the case, these partially chlorinated products break down, forming insoluble compounds.

The difficulties resulting from the decomposition of partially chlorinated rubber are quite serious, especially in commercial operations. The insoluble product of decomposition deposits as a film or layer which coats the inner surface of a reaction vessel, and any other surface which is heated. This prevents proper heating, and frequent cleaning of the equipment is necessary when such decomposition occurs. In addition, decomposition leads to lower yields, due to the loss of materials. The results of heating the solution to eliminate HCl at an intermediate stage of the reaction are therefore quite likely to be expensive, as well as troublesome.

I have found that these difficulties can be overcome by employing intermediate air-blowing to eliminate the undesired hydrochloric acid, thus permitting the chlorination to go rapidly to completion. In a typical embodiment of this invention, disaggregated and dehydrated rubber cement containing 15 pounds of rubber to 50 gallons of carbon tetrachloride is chlorinated, starting at a temperature of about 30° C. During an initial period of about 3 hours, from 95 to 100 per cent of the theoretical amount of chlorine required for a product containing 65.1 per cent chlorine is added, and the temperature is gradually raised from about 30° to about 55 to 60° C. The addition of chlorine is then interrupted, and the solution is agitated or recirculated for about an hour to insure maximum reaction with the chlorine present. During this stage, the temperature is gradually raised to about 65° to 70° C. Air is then blown through the solution for about 30 minutes, and this quickly eliminates the major portion of the HCl in the reaction vessel. Air at very low pressures, such as 2 pounds per square inch, may be satisfactorily employed for this purpose, although the most desirable pressure depends, of course, on the size and shape of the vessel.

After this intermediate air-blow, chlorine is again introduced into the reaction vessel until approximately 10 per cent in excess of the theoretical requirement has been added. The reaction is then allowed to proceed for an additional hour, and the residual chlorine and HCl gas are then removed by blowing with air at 5 pounds pressure, for example, as previously described. This final air-blow or some other method of reducing the acidity to the desired point is necessary, even when the intermediate air-blow is employed.

In both the intermediate and the final air-blowing stages, some solvent (usually carbon tetrachloride) is usually carried out of the reaction vessel, together with the gaseous HCl and chlorine. The effluent gases and vapors are passed through suitable scrubbers and condensers where the constituents are recovered, in known manner.

An outstanding advantage of the present invention is that it makes it possible to prepare chlorinated rubber having a chlorine content of 65 per cent or more in a much more convenient and economical manner, and in considerably higher yield, than the processes heretofore known.

As a further illustration of a useful embodiment of my invention, a complete cycle of the operations involved in chlorinating rubber will now be described. The first step in the production of rubber chloride is the preparation of a rubber cement or rubber solution. For this purpose, a chlorine-resistant solvent, such as carbon tetrachloride, is supplied to a cement-making vessel, and rubber is added to the solvent, advantageously in small pieces, in sufficient quantity to make a solution of the desired concentration. A concentration of about 2 or 3 per cent is usually most advantageous, although concentrations up to about 5 per cent may be employed. The rubber may be pale crepe, or deproteinized rubber, or any other grade which is suitable for the preparation of a rubber chloride having the desired purity.

The cement-making vessel is advantageously a closed kettle connected with a reflux condenser open to the atmosphere, and equipped with an agitator and heating means such as a steam jacket. After the rubber is added to the solvent in the vessel, the mixture is gradually heated with agitation until a solution is obtained. The heating is then continued to bring the solvent up to the boiling point or reflux temperature, which is maintained for several hours, 4 to 5 hours being usually satisfactory. During this time, or a longer period if necessary, any water present in the system is eliminated by azeotropic distillation and passes out through the condenser. The solution or dispersion of rubber is also disaggregated and approaches a condition of minimum viscosity. After dehydration and disaggregation are completed, the temperature may be raised for a brief period sufficiently to distil over a little of the solvent, thus eliminating any water or water-vapor which may have accumulated in the top of the reflux condenser.

The disaggregated anhydrous cement is then ready for chlorination, which may be effected in the same vessel, but is more advantageously accomplished in another vessel. If desired, the cement may be freed from haze-forming impurities by suitable treatment before chlorination, as described in my application 245,293, for example. In any event, the cement is ordinarily cooled to a temperature of 30° to 40° C. before starting chlorination. The chlorinating vessel is advantageously glass-lined and provided with one or more suitable inlets for delivering chlorine into the solution, usually near the bottom of the vessel. It is also advantageously provided with a circulating system which withdraws solution from the bottom of the vessel, and returns it to the top during chlorination. This tends to draw the chlorine into the solution, and to increase the rate of reaction with the rubber. The circulating system is also advantageously provided with means for irradiating the solution to further increase the speed of reaction. Circulation and irridiation, when employed, are generally started before the flow of chlorine is started.

The chlorine is then introduced quite rapidly, advantageously through a meter, and about 95 to 100 per cent of the theoretical chlorine requirement for making rubber heptachloride is introduced during a three hour period. The heat of reaction usually raises the temperature of the solution to about 60° to 70° C. during this period.

In one embodiment of the present invention, the flow of chlorine is discontinued after about 95 per cent of the theoretical requirement has been added, and the solution is re-circulated for about an hour to permit reaction of the maximum amount of the introduced chlorine. Dry air at a pressure of 2 pounds per square inch, for example, is then blown through the solution for about thirty minutes to remove HCl which has been formed by the substitution reactions, and which tends to inhibit the final stages of chlorination. This air must be dry to prevent undesirable additional acid formation and other disadvantageous results.

During this intermediate blowing with air, the temperature of the solution falls off slightly, but generally not below 60° C. After the air-blowing is discontinued, chlorine is again introduced at a slow rate for about two hours, at which time an excess of about 10 per cent of chlorine over the theoretical requirements has been supplied to the system. The flow of chlorine is then discontinued again, and the solution is recirculated for another half hour or hour to permit further reaction. At this point, the rubber in solution is generally chlorinated to a composition containing at least 65 per cent chlorine. Advantageously, the chloride at this stage contains 66 per cent or more of chlorine.

Regardless of whether the intermediate air-blow or some other method is employed to eliminate HCl at an intermediate stage, it is necessary at the end of the reaction to eliminate HCl and excess chlorine. This is most effectively accomplished in accordance with the present invention by a final blowing with dry air. As previously noted, this is effective when the system is substantially anhydrous. The rate of blowing for the final elimination of acid is advantageously somewhat higher than the rate employed during the intermediate stage, and dry air may be supplied through the chlorine inlets at 5 pounds pressure, for example, for about thirty minutes to one hour. This is generally sufficient to reduce the acidity to less than 0.03 per cent, calculated at HCl. One or more samples are ordinarily withdrawn during this stage and titrated with N/10 NaOH to follow the course of the acid removal, and to determine the acidity before the chlorinated rubber solution is withdrawn from the chlorinator. Chlorine and HCl evolved during the intermediate or final air-blow, or both, together with solvent vapors carried out of the system, are recovered in known manner, thus preventing waste and air pollution.

The substantially acid-free solution of rubber chloride containing 65 per cent or more chlorine may then be subjected to further purification, if desired, as described in my applications Serial No. 69,415 and Serial No. 245,293, for example. In many cases this purification may be omitted, however. The solution, with or without purification, is then usually treated to recover the rubber chloride in solid form. This is advantageously effected by a precipitation method, in which a non-solvent for rubber chloride, such as water or a petroleum fraction or an alcohol, is added to the solution. Various methods of precipitating are known to the art, and the details of this phase of the process are not part of the present invention. The physical condition of the precipitated rubber chloride depends considerably on the method of precipitation employed, and a satisfactory method in which the condition of the recovered product is readily controlled is described and claimed in my co-pending application, Serial No. 287,641, filed July 31, 1939.

The essential feature of the present invention is that hydrochloric acid, or chlorine, or both are eliminated from substantially anhydrous solutions of partially or completely chlorinated rubber by blowing with air. As pointed out in more detail hereinabove, this method of eliminating acidity has special advantages in connection with the manufacture of rubber chloride, and obviates many difficulties previously encountered in this art. My invention makes it possible to produce rubber chloride of any desired purity in a simpler and more economical manner than has heretofore been available. It is to be understood that other inert gases may be used instead of air in the process of this invention, and that the use of such other gases is included in such terms as "air-blowing," as used herein.

What I claim is:

1. In the manufacture of chlorinated rubber, eliminating HCl from a substantially anhydrous solution of chlorinated rubber by passing a current of dry inert gas through the solution.

2. In the manufacture of chlorinated rubber, forming a substantially anhydrous solution of rubber, intimately contacting the solution with gaseous chlorine to form therein a chlorinated rubber containing at least 50 per cent chlorine, and then passing dry air through the solution to remove HCl therefrom.

3. The method of claim 2, wherein the said dry air is passed through a substantially anhydrous solution of chlorinated rubber having a chlorine content of at least 65 per cent and reduces the acidity of the solution to a maximum of 0.03 per cent, calculated as HCl.

4. The method of claim 2, wherein a flow of gaseous chlorine is introduced into the said solution of rubber and contacted therewith until chlorinated rubber having a chlorine content less than 65 per cent is formed in the solution, wherein the flow of chlorine is then discontinued and the said dry air is passed through the solution to remove HCl therefrom, and wherein a further amount of gaseous chlorine is then contacted with the solution.

5. The method of manufacturing chlorinated rubber, comprising dissolving rubber in a chlorine-resistant organic solvent, heating the resulting solution under reflux to dehydrate the solution and reduce its viscosity, introducing gaseous chlorine into the solution and intimately contacting the solution therewith until the rubber is chlorinated to a compound containing 50 to 65 per cent of chlorine, discontinuing the flow of chlorine and passing a dry inert gas through the solution to eliminate HCl therefrom, introducing a further quantity of chlorine and contacting it with the solution until the rubber is chlorinated to a compound containing at least 65 per cent chlorine, and passing a further quantity of dry inert gas through the solution to reduce its acidity to a maximum of 0.03 per cent, calculated as HCl.

JAMES WALLACE RAYNOLDS.